United States Patent [19]

Epstein

[11] Patent Number: 5,023,746
[45] Date of Patent: Jun. 11, 1991

[54] SUPPRESSION OF TRANSIENTS BY CURRENT SHARING

[76] Inventor: Barry M. Epstein, 7523 Cliffbrook, Dallas, Tex. 75240

[21] Appl. No.: 431,681

[22] Filed: Nov. 3, 1989

Related U.S. Application Data

[63] Continuation of Ser. No. 279,943, Dec. 5, 1988, abandoned.

[51] Int. Cl.$^5$ ............................................. H02H 3/20
[52] U.S. Cl. ........................................ 361/56; 361/91; 361/111; 361/117
[58] Field of Search ................... 361/56, 57, 59, 91, 361/111, 117, 118, 119

[56] References Cited

U.S. PATENT DOCUMENTS

| | | | |
|---|---|---|---|
| 4,023,071 | 5/1977 | Fussell | 361/91 X |
| 4,563,720 | 1/1986 | Clark | 361/56 |
| 4,616,286 | 10/1986 | Breece | 361/118 X |
| 4,630,163 | 12/1986 | Cooper et al. | 361/56 |
| 4,675,772 | 6/1987 | Epstein | 361/56 |
| 4,677,518 | 6/1987 | Hershfield | 361/118 X |

Primary Examiner—Derek S. Jennings
Attorney, Agent, or Firm—Kenneth R. Glaser

[57] ABSTRACT

A multiple element current sharing surge voltage protector is connected in parallel between a voltage source and the input of an electrical load. The protective network includes a low pass shunt capacitor filter, a first suppressor having a selenium varistor clamping device connected in parallel shunt relation with the low pass capacitor filter, and a second suppressor having a plurality of MOV varistor clamping devices connected in parallel shunt relation with the low pass capacitor filter and the selenium suppressor. The parallel connected MOV varistors remain substantially in a non-conducting, open circuit condition until the surge voltage exceeds the turn-on clamping voltage of the MOV suppressors. After turn-on of the MOV varistors, the total surge current flow is divided through the selenium varistor and the multiple MOV varistors, and the shunt capacitor. The devices and quantities of each are selected for the desired suppression V/I curve to achieve maximum clamping as close to the peak of the power sine wave at a broad range of currents without disturbing the input power waveform and without abrupt changes in the suppression curve.

3 Claims, 1 Drawing Sheet

SUPPRESSION OF TRANSIENTS BY CURRENT SHARING

This is a continuation of co-pending application Ser. No. 07/279,943 filed on Dec. 5, 1988, now abandoned.

FIELD OF THE INVENTION

This invention relates to surge suppression apparatus for protecting electrical equipment, and more particularly to suppressor circuits for protecting sensitive loads from damaging power surges and transients.

BACKGROUND OF THE INVENTION

There are many applications where it is necessary to protect electrical equipment from power surges, high energy transients and high frequency noise or random voltage embedded in the power sine wave which could damage or adversely affect the operation of such equipment. Such protection is particularly important for equipment having highly sensitive or complex loads which are susceptible to power surges and high frequency content transients. For example, conventional data processing equipment includes sensitive components which are particularly susceptible to damage or loss of stored data therein due to reactive voltage spikes occurring as a result of power surges in the supply lines, switching transients, or as a consequence of external causes such as lightning which strikes the supply line or produces an electromagnetic pulse which is inductively coupled into the supply line, or reactive spiking or ringing within the load's own power supply transformers which upsets the DC output of the internal power supply. Some of these conditions may also occur with respect to, and thus damage, sophisticated telecommunication and telephone equipment installations, for example.

DESCRIPTION OF THE PRIOR ART

Optimum surge suppression electronic filtering circuitry is designed to maintain a power waveform which is at all times the least disturbing to the load equipment which it serves. This means that the high frequency content produced by the external power source, or by the surge suppressor, or by the load itself, must be kept to a minimum. A low suppression level close to the peak of the sine wave must also be obtained but without distorting the source waveform and with maximum reliability of the suppressor.

These requirements rule out the use of prior art suppressors such as gas tube arrestors as part of the circuitry. One disadvantage of a gas tube arrestor is that when it is turned on, a voltage substantially lower than line voltage results during the ionization period. This low voltage disturbs the basic wave shape, so that operation of the gas tube arrestor inherently distorts the source power waveform applied to the load equipment, and generates high frequency noise.

Often, the conduction voltage of the arrestor may drop to as low as 50 volts and remain at that voltage for up to one-half cycle (8 milliseconds). High frequency ringing, arcing and distortions are also generated by the operation of the gas tube arrestor and will disturb load equipment operation. Typical designs using gas tube arrestors are often attempts to obtain the lowest manufactured cost rather than the best performance in terms of the sensitivity of the attached load.

Such prior art approaches are disclosed in U.S. Pat. No. 4,616,286 which uses a gas tube, a selenium varistor and a metal oxide varistor as its high energy suppressor, and in U.S. Pat. No. 3,793,535 which uses a thrysistor switching device. Thus, when the output stage operates unprotected and directly connected to the load, high frequency transients can be injected into the load. A further disadvantage is that the suppressor stages contain series elements between them and therefore limit load current to a relatively small value on the output side by requiring a series "in line" impedance.

Moreover, should either suppressor be overloaded or saturated by the low impedance or high energy of the transient, the gas arrestor tube will turn on. This produces a sharp decline in the amplitude of the applied power waveform to a low level, typically 50 volts. This sharp decline is reacted by a high frequency pulse which disturbs the attached power supply, and the potentially long interval at the reduced amplitude level (until the end of the half cycle) further disturbs operation of the load, with the effect being essentially the same as a loss of power for up to one-half cycle. Sensitive data processing loads are adversely effected by such power fluctuations.

Another disadvantage of such prior art suppressor circuits is that at certain times, based upon transient current, only one suppressor element may be operational, and will fail due to the high energy reacted by it.

Other protective networks have been proposed for protection of such equipment from such power surges and transients. See, for example, U.S. Pat. Nos. 3,890,543; 3,943,427; 4,023,071; 4,067,054; 4,068,279; 4,127,888; and, 4,675,772.

Prior art protective networks have not been completely satisfactory for all conditions of service. Specifically, it is desirable that such protective networks prevent the adverse effects of surges and transients occurring at the source, or as a consequence of local or internal circuit conditions such as a circuit breaker actuation, as well as being effective to prevent reactive spike build-up at the load side of the network. It is desirable to provide such surge and transient suppression in synergistic combination with power filtering, as well as to adapt such protective networks for convenient installation with multiple phase loads as well as single phase loads. Further, it is desirable that the protective network be capable of handling heavy loads so that it will not fail often under high stress conditions. Most prior art approaches consider elementary spike protection only, not the overall protection and implications on the load equipment itself.

Other prior art approaches have attempted to parallel multiple avalanche diode devices having identical I/V characteristics. In such applications, exacting testing must be performed to match all devices for identical performance. Such a match rarely can be maintained in use because of parts wear.

OBJECTS OF THE INVENTION

It is therefore the principal object of the present invention to provide new and improved power surge and transient voltage protection and electronic filtering for electrical equipment.

Another object of the invention is to provide protection against adverse effects of high energy power surges, voltage transients and reactive spikes from both the source and the load.

Another object of the invention is to provide effective protection against lower voltage transients.

Another object of the invention is to achieve high transient energy reliability without distortion of the power waveform.

Another object of the invention is to permit large load currents by eliminating series suppressor elements.

Yet another object of the present invention is to provide power surge and transient voltage protection in synergistic combination with broad range power filtering, and optional leading edge protection.

Yet another object of the invention is to provide a power surge and transient voltage protection by paralleling multiple suppressor devices without requiring exact device matching and selection procedures.

SUMMARY OF THE INVENTION

In accordance with the foregoing and other objects, the preferred embodiment of the present invention combines a multiple element current sharing surge voltage protector and a low pass shunt attenuator adapted for parallel connection between a voltage source and the input of an electrical load. The protective network includes a low pass shunt capacitor attenuator, a first suppressor having a relatively low turn-on voltage such as a selenium varistor clamping device connected in parallel shunt relation with the low pass capacitor attenuator, and a multielement suppressor having a relatively high turn-on voltage such as a plurality of MOV varistor clamping devices connected in parallel shunt relation with the low pass capacitor attenuator.

In the preferred embodiment, high frequency transients are attenuated by the shunt capacitor regardless of position on the sine wave, and surge suppression is provided by the multiple element current sharing surge protectors. For surge voltages below a first voltage threshold, surge suppression is provided by a selenium varistor having a turn-on clamping voltage which is selected to be relatively close to the peak amplitude of the input power waveform. Relatively high current, high voltage surge conditions are accommodated and safely handled by exceeding a second voltage threshold level one or more MOV varistors which are connected in parallel with the attenuator capacitor. The parallel connected of MOV devices share current with the selenium varistor at high voltage, high current conditions, such as repeated applications of the 3,000 ampere test current specified by the IEEE 587B standard. According to this arrangement, the MOV varistors are selected to have a turn-on clamping voltage which is greater than the turn-on clamping voltage of the selenium varistor at low currents.

The selenium suppressor provides surge protection in the voltage range of its clamping voltage up to the clamping voltage of the parallel connected MOV suppressors, and at current levels which are safely conducted by the selenium suppressors. That is, the surge current is shunted by the selenium suppressor for voltage levels less than the turn-on clamping voltage of the MOV suppressors. The MOV varistors remain substantially in a non-conducting, open circuit condition until the surge voltage exceeds the turn-on clamping voltage of the MOV suppressors. After turn-on of the MOV varistors, the total current flow is divided and shared by the selenium varistor and the multiple MOV varistors.

In practice, at higher energy levels, the selenium suppressor may be in the "turn-up" region of the V/I dynamic resistance curve. Current sharing to shunt away relatively small amounts of current by paralleling MOV suppressors results in a greatly improved V/I curve for the combination of devices. At the same time, high reliability is achieved for the total configuration since the shared current flow through MOV suppressors is small enough to be well below their typical maximum rated currents.

The relative dynamic resistances also allow simple combination of the various suppressor devices which have without complex exacting selection of matching devices as typical with matched V/I characteristic devices such as avalanche diodes.

Other objects and advantages of the present invention will be appreciated by those skilled in the art upon reading the detailed description which follows with reference to the attached drawings.

DETAILED DESCRIPTION OF THE PREFERRED EMBODIMENT

Figure 1:
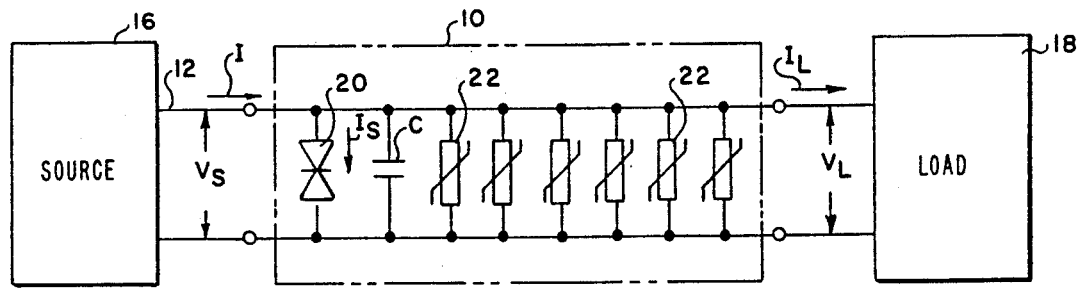
FIG. 1 is a simplified schematic diagram illustrating the basic surge voltage protector and filter network of the present invention.
Figure 2:
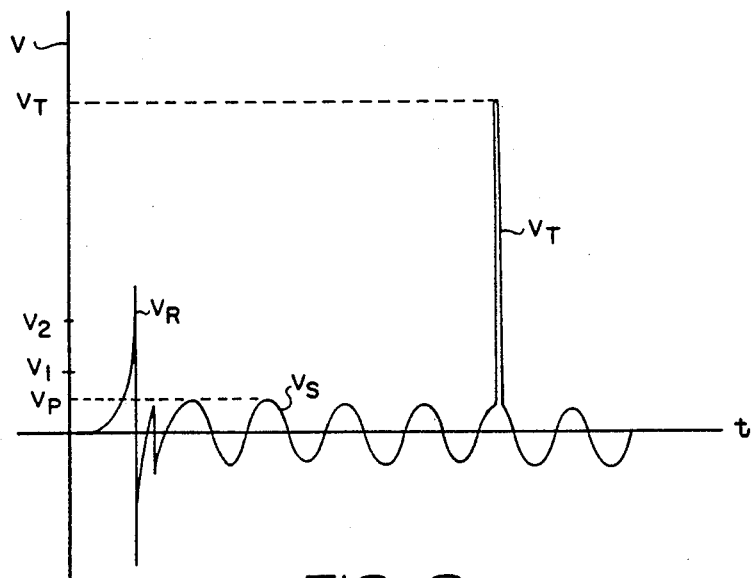
FIG. 2 is a graphic representation of source voltage waveform time as applied to the input of the surge suppression network shown in FIG. 1; and, FIG. 3 is a graphic representation of the voltage/current characteristics of selenium and MOV suppressor devices.

Referring now to the accompanying drawings, there is illustrated in FIG. 1 a preferred embodiment of a high energy/high voltage and low energy/low voltage surge suppression circuit 10 which is connected across power conductors 12, 14 of a power source 16 which produces a sinusoidal power waveform $V_S$. High energy reactive transients $V_R$ and spike overload transients $V_T$ are superimposed on the $V_S$ waveform as a result of external causes such as direct or indirect lightning strikes, reactive spiking as a result of power interruption or reconnection, or as a result of deliberate overloading during performance testing.

The suppression circuit 10 is inserted in parallel across the power conductors 12, 14 which conduct alternating current power from the source 16 to an electrical load 18. The purpose of the surge suppression circuit 10 is to minimize adverse effects of external disturbances on the performance of sensitive electronic components within the load 18, and also to prevent direct damage to the load 18 as a result of high energy transient voltages $V_R$, $V_T$ which are impressed across the power conductors 12, 14. There is a need, therefore, to minimize such disturbances at all times with respect to the load 18, including minimizing the high frequency components and the surge voltage amplitude threshold, but not to interfere with the basic power sine wave.

A typical electrical load 18 is represented by conventional conventional data processing equipment in which an internal power supply develops a regulated DC voltage from a single phase, 120 volt, 60 Hz supply $V_S$. Such power supplies exhibit three basic sensitivities:

(1) Damage due to over-voltage spikes, for example a 6,000 volt spike $V_T$ induced by a direct lightning strike to the power line;

(2) High frequency disturbances coupled through the power lines which penetrate the power supply and disrupt solid state circuitry; and, (3) Reactive spiking or ringing within the internal power supply transformers which upsets the DC output of the power supply and causes disturbances to logic circuits connected thereto.

To avoid disturbing sensitive components of the electrical load 18, it is necessary to minimize the high frequency content of the waveform which is produced by the external source 16, or produced by the suppression network 10, or which is produced by the load itself. A low suppression level must also be obtained but without disturbance to the power waveform. High frequency content of such disturbances is reduced by a capacitor C, which cooperates with the internal resistance of the source to produce a low pass filter which effectively attenuates high frequency components of high energy transients. The amount of attenuation, and the cut-off frequency at which substantial attenuation begins is determined by the magnitude of the capacitor C. This value can be adjusted as desired. In the preferred embodiment, for operation of the power voltage $V_S$ at 60 Hz is in the range of at least 2 microfarads up to 28 microfarads. In addition, small value high speed frequency capacitors such as ceramics may be paralleled to compensate for turn-on delay of the suppression devices or circuitry.

Such large capacitance values provide heavy duty filtering and permit the output waveform to maintain the best approximation to the symmetrical sine wave of the power waveform $V_S$, while minimizing disturbance to the attached load. For example, the transient reactive component $V_R$ having an initially positive spike and then a negative spike is effectively smoothed by the low pass attenuation effect of the capacitor C. Moreover, an under-voltage situation of the kind discussed with reference to the operation of gas filled arrestor tubes is avoided. Generally, the value of the capacitor C should be chosen to limit the slope of the leading edge of the transient, regardless of its position on the sine wave, which in turn limits the frequency content of the voltage transient signal $V_L$ impressed across the load 18.

Figure 3:
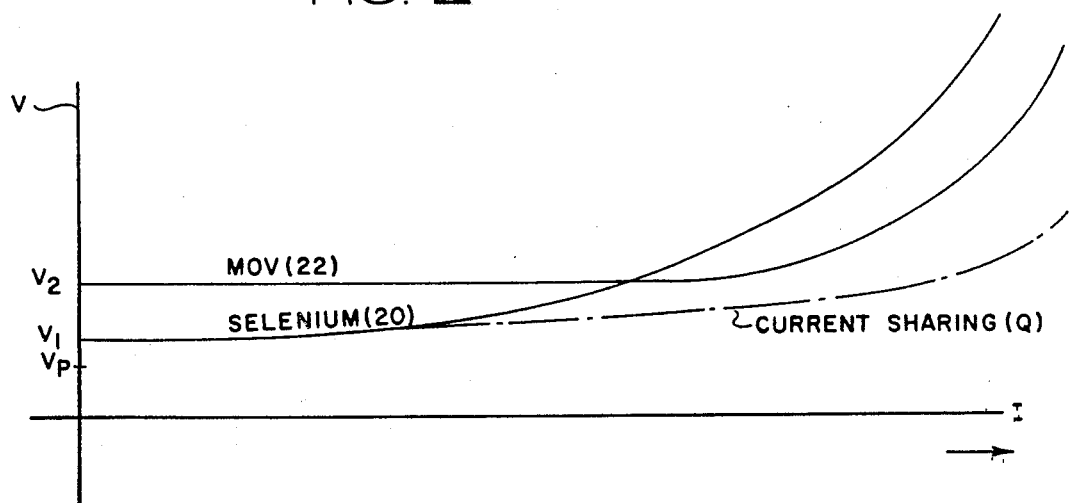

Power surge and transient voltage protection is provided synergistically in combination with the low pass attenuation capacitor C by a current sharing selenium suppressor 20 which is connected in parallel shunt relation across the attenuator capacitor C. The voltage/current response of the selenium suppressor as shown in FIG. 3 is not linear, with voltage rising slightly with current. Large area selenium suppressors are desirable because of their high reliability, high speed, high current capacity, no reactive ringing, ability to clamp relatively close to power line voltage and open circuit failure mode.

The selenium suppressor 20 is a non-linear, voltage dependent resistor whose resistance falls significantly as the applied voltage increases. The voltage/current characteristic waveform of the selenium device is illustrated by the waveform designated Selenium (20) in FIG. 3. The voltage/current characteristic waveform is approximated by the equation:

$$I = kV^A$$

where I is amperes, V is volts and the constants k and A are fixed for any specific type of voltage dependent resistor.

In the preferred embodiment, the selenium suppressor 20 utilizes an aluminum base plate on which selenium semiconductor layers are deposited. A sufficient number of such selenium coated aluminum plates are stacked together to yield a predetermined turn-on clamping voltage $V_1$. The turn-on clamping voltage $V_1$ is selected to be arbitrarily close to the maximum amplitude $V_p$ of power waveform $V_S$. For example, $V_1$ is preferably selected to be 200 volts for a sinusoidal source waveform $V_S$ having 120 volts RMS output. Typical values of the parameters A, V are A=20 and V=0.05, which means that the current increases with voltage at an enormous rate proportional to the 20th power.

The metal oxide varistor (MOV) devices 22 are also voltage-dependent resistors having a non-linear voltage/current characteristic as illustrated by the waveform designated MOV (22) in FIG. 3. It will be noted that the composite current sharing waveform (Q) of the selenium device conducting in parallel with a multiplicity of MOV devices can be selected to have a flatter response than the corresponding typical waveforms of single devices at high currents, and that it rises less steeply with current increase.

Both the selenium suppressor 20 and the MOV suppressors 22 are effectively open circuited when voltages below a predetermined minimum are impressed across their terminals, and exhibit a high degree of conduction when the voltage across the terminals exceeds the minimum voltage. Thus, upon the occurrence of an excessive voltage across the particular suppressor, its effective resistance is reduced, thereby shunting the excessive current through the device and clamping the voltage at that level. As a result, the selenium suppressor 20 and MOV suppressors 22 are principally effective to protect the load 18 against power surges and voltage transients, and both are also effective to prevent reactive spike voltage build-up as a consequence of conditions occurring within the load 18 or as impressed upon the power conductors 12, 14.

According to an important feature of the present invention, the clamping voltage level $V_1$ of the selenium suppressor is selected at a level less than the turn-on clamping voltage $V_2$ of the parallel connected MOV devices. Suppression of surge voltages exceeding clamping voltage $V_2$ is provided by a plurality of MOV varistors 22 which are connected in parallel shunt relation with the low pass attenuator capacitor C. The voltage/current (V/I) characteristic of the plurality of parallel connected MOV varistors 22 is different with respect to the V/I characteristic of the selenium suppressor 20 in that the parallel combination of MOV varistors has a higher turn-on clamping voltage, but its characteristic curve is relatively flat at higher current levels as compared with the selenium characteristic curve, as shown in FIG. 3. Because of this difference, the plurality of parallel connected MOV protector devices turn on and clamp at a higher voltage level, and that clamping level increases only slightly as compared with the increase for the selenium suppressor at a specific current level.

Accordingly, the total surge current I associated with a high energy transient is divided and distributed on a continuous basis through the selenium suppressor 20 and through each of the MOV suppressors 22. The MOV suppressors 22 protect the selenium suppressor 20 at very high current levels by sharing the current and by clamping the applied surge voltage at a safe level below the maximum voltage rating of the selenium suppressor. Moreover, the multiple MOV suppressors 22, as many as six or more, are connected in parallel across the selenium suppressor 20 to divide the total surge current and distribute it through the parallel connected suppressors 20, 22 at substantially reduced current levels. Thus, the total surge current is divided and reduced to any arbitrary level per suppressor device as desired. By limiting the surge current level per suppressor device, the useful operating life of each suppressor device is extended, reliability of the overall suppressor circuit 10 is improved substantially, and the suppression voltage/current ratio I/V of the composite waveform can be tailored as desired. Note that, due to the sharing of currents, the composite current sharing I/V waveform Q is lower than the curve for any element acting alone and is smooth.

Thus the parallel connected suppressors operate synergistically together providing a continuous V/I curve which does not interfere with the basic power wave and provides high reliability.

In practice, the majority of current flow will be conducted through the selenium device 20, with just a fraction of current diverted through the MOV devices 22 to achieve the desired composite I/V curve Q and individual device protection by limiting the current flow through each suppressor.

The unmatched selenium device 20 and MOV devices 22 may be combined easily without careful matching since the role of the MOV devices is to divert relatively small amounts of current to obtain a lower operating point on the composite, selenium dominant, dynamic I/V curve Q. Since the selenium device 20 is the dominant current suppressor element, multiple MOV devices 22 may also be utilized without exacting matching tests. Unmatched production units of the same class are close enough. Similarly, other unmatched devices, such as avalanche diodes, may be used to good advantage.

It will be apparent that as an additional feature of the present invention, the protective network 10 is particularly adaptable for convenient installation with, and protection of, multiple phase loads, with separate surge protection circuits 10 being connected across each phase.

Various modifications to the disclosed preferred embodiment, other protective devices such as avalanche diodes, multiplicities or single devices, as well as alternative embodiments, of the present invention will become apparent to one skilled in the art without departing from the scope and spirit of the invention as defined by the appended claims.

What is claimed is:

1. In a system wherein AC power is supplied from an AC power source through power supply conductors to an electrical load, the improvement comprising:
   (a) means for connecting said AC power source across said load; and
   (b) a protector network disposed in parallel connected relation between said AC power source and said load, said protector network comprising:
     (i) a first voltage suppressor connected across the said power supply conductors,
     (ii) a second voltage suppressor connected across the said power supply conductors, and in direct parallel connection with said first voltage suppressor, the break-down voltage of said second voltage suppressor being greater than the break-down voltage of said first voltage suppressor, said second voltage suppressor further comprising a plurality of metal oxide varistors connected in direct parallel relationship with one another, and
     (iii) capacitive filter means connected in direct parallel connection with, and intermediate, said first and second voltage suppressors for attenuating high frequency components of said AC power.

2. The network as defined by claim 1 wherein said first voltage suppressor is a selenium varistor.

3. In a system wherein AC power is supplied from an AC power source through power supply conductors to an electrical load, the improvement comprising:
   (a) means for connecting said AC power source across said load; and
   (b) a protector network disposed in parallel connected relation between said AC power source and said load, said protector network comprising:
     (i) a first voltage suppressor connected across the said power supply conductors,
     (ii) a second voltage suppressor comprising a plurality of parallel connected metal oxide varistors connected across the said power supply conductors, and in direct parallel connection with said first voltage suppressor, the break-down voltage of said second voltage suppressor being greater than the break-down voltage of said first voltage suppressor, and
     (iii) filter means connected in direct parallel connection with, and intermediate, said first and second voltage suppressors for attenuating high frequency components of said AC power.

* * * * *